United States Patent
Schuster et al.

(10) Patent No.: US 7,413,115 B1
(45) Date of Patent: Aug. 19, 2008

(54) AUTOMATED BANKING MACHINE AUDIBLE USER INTERFACE SYSTEM AND METHOD

(75) Inventors: Ray Schuster, Lowellville, OH (US); Dolar Harshadrai Vaishnav, Brewster, OH (US); Bill A Cole, Massillon, OH (US); Pedro Tula, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 1340 days.

(21) Appl. No.: 10/269,418

(22) Filed: Oct. 11, 2002

Related U.S. Application Data

(60) Provisional application No. 60/328,812, filed on Oct. 12, 2001.

(51) Int. Cl.
*G07F 19/00* (2006.01)
(52) U.S. Cl. .................. 235/379; 235/380; 235/451; 705/43
(58) Field of Classification Search .................. 235/379, 235/380, 381, 451; 705/35, 43; 902/8
See application file for complete search history.

(56) References Cited

U.S. PATENT DOCUMENTS

| | | | | |
|---|---|---|---|---|
| 4,760,245 A * | 7/1988 | Fukaya | ...................... | 235/379 |
| 6,047,261 A * | 4/2000 | Siefert | .......................... | 705/11 |
| 6,061,666 A * | 5/2000 | Do et al. | ........................ | 705/43 |
| 6,527,171 B1 * | 3/2003 | Brooks et al. | ................ | 235/379 |
| 6,539,361 B1 * | 3/2003 | Richards et al. | ............... | 705/35 |
| 6,655,581 B1 * | 12/2003 | Takishima et al. | ........... | 235/379 |
| 7,191,152 B1 * | 3/2007 | Mukogawa | ................... | 705/43 |
| 7,255,200 B1 * | 8/2007 | Walter | ......................... | 186/64 |
| 2006/0038004 A1 * | 2/2006 | Rielly et al. | ................. | 235/379 |
| 2006/0068817 A1 * | 3/2006 | Black et al. | .................. | 455/466 |
| 2007/0138256 A1 * | 6/2007 | Coventry | ..................... | 235/379 |

* cited by examiner

*Primary Examiner*—Seung H Lee
(74) *Attorney, Agent, or Firm*—Christopher L. Parmelee; Ralph E. Jocke; Walker & Jocke LPA

(57) ABSTRACT

An automated banking machine is operative to output a visual and audible user interface which enables a consumer to operate the machine. The visual user interface includes a plurality of hierarchically organized visual screens. For each visual screen, the exemplary machine includes corresponding verbal instructions which are output through external loudspeakers or a headphone placed in operative connection with an external port of the machine. Upon insertion of the headphone into the port, the machine is operative to mute the output to any external loudspeakers and set the audio output through the headphone to a minimum or medium volume level. The automated banking machine is responsive to operating at least one volume control key to cycle the audible output through a plurality of different volume levels. For each input, the machine is operative to output verbal description of the function associated with the input.

51 Claims, 9 Drawing Sheets

AUTOMATED BANKING MACHINE AUDIBLE USER INTERFACE SYSTEM AND METHOD

CROSS REFERENCE TO RELATED APPLICATIONS

This application claims benefit of U.S. Provisional Application Ser. No. 60/328,812 filed Oct. 12, 2001.

TECHNICAL FIELD

This invention relates to automated banking machines. Specifically this invention relates to an automated banking machine apparatus and system that is more readily operated by a consumer that is visually impaired.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts, to pay bills, to transfer funds or to cash checks. Other types of automated banking machines may print or dispense items of value such as coupons, tickets, wagering slips, vouchers, checks, food stamps, money orders, scrip or travelers checks. For purposes of this disclosure references to an ATM, an automated banking machine or automated transaction machine shall encompass any device which carries out transactions including transfers of value.

ATMs generally include a display device which is operative to output a visual user interface. The user interface includes instructions and selectable options which visually guide a user through the operation of the machine. For example, ATMs often include a hierarchical menu for navigating through a plurality of different user interface screens. Such menus often list various types of transaction functions which may be performed at the ATM such as a withdrawal of cash or the deposit of a check. Although a consumer with normal vision can readily operate such an ATM by following the commands visually presented through the display device, a consumer who is visually impaired may not be able operate such an ATM as easily. As a result there exists a need for an ATM which is capable of being operated by consumers with either normal or impaired vision.

DISCLOSURE OF INVENTION

It is an object of an exemplary form of the present invention to provide an automated banking machine at which a user may conduct transactions.

It is a further object of an exemplary form of the present invention to provide an automated banking machine that may be operated by consumers with normal vision.

It is a further object of an exemplary form of the present invention to provide an automated banking machine that may be operated by consumers with impaired vision.

Further objects of the present invention will be made apparent in the following Best Modes for Carrying Out Invention and the appended claims.

The foregoing objects are accomplished in an exemplary embodiment of the invention by an automated banking machine that includes output devices such as a display screen, and input devices such as a touch screen, a keyboard, card reader or other type input device. The banking machine may further include devices such as a cash dispenser mechanism for sheets of currency, a printer mechanism, a depository mechanism and other transaction function devices that are used by the machine in carrying out banking transactions.

The banking machine is in operative connection with at least one computer. The computer is in operative connection with the output devices and the input devices, as well as with the cash dispenser mechanism, and other physical transaction function devices in the banking machine. The computer includes software programs that are executable therein. The software may include terminal control software which is operative to cause the machine to perform a plurality of different transaction functions. In addition the terminal control software of the exemplary embodiment may be operative to cause the machine to provide both a visual and audible user interface for guiding a consumer through the operation of the machine.

In one exemplary embodiment, the terminal control software may be operative to cause the computer to output a visual menu for navigating between different user interface screens. Such screens may include transaction information and selectable options for operating the automated banking machine. For each visual user interface screen, the exemplary embodiment of the terminal control software may be operative to cause the computer to output corresponding audible outputs through external loudspeakers and/or an output device that is connectable to a set of headphones. The audible outputs may include verbal instructions which describe the functions and operations available for the current state of the banking machine. Such audible verbal instructions may further include a description of which keys, buttons, transaction function devices, and other input devices to press, manipulate, or activate in order to perform the available machine functions and operations. In addition such audible verbal instructions may further include a description of the relative locations of the keys, buttons, transaction function devices, and other input devices for performing the functions and operations. Further, such verbal instructions may include a description of how to use or manipulate the keys, buttons, transaction function devices, and other input devices of the banking machine. For example, to initially activate the automated banking machine, the audible verbal instructions may include a description of the location of a card reader of the machine and indicate in what orientation a card may be inserted and/or swiped in the card reader for purposes of being read. Further audible verbal instructions may describe the types of transaction functions that are available and which keys or other input devices must be pressed or manipulated in order to either select, modify, or cancel each of the transaction functions.

As used herein the term verbal corresponds to spoken human language words generated by either a human voice or machine synthesized human voice emulation. In exemplary embodiments, audible verbal instructions may include a plurality of spoken words produced responsive to digital or analog recordings of either a human voice or computer synthesized voice. In addition, audible verbal instructions may be produced directly from hardware devices and/or software programs operating in the ATM which are capable of synthesizing human language words, sentences, syllables and other human language communication sounds. Such hardware devices and/or software programs for example may include text to speech synthesizer devices which are operative to generate sound signals or audible outputs which include verbal instructions responsive to alphanumeric text.

The exemplary embodiment may include a plurality of features which enable the machine to be easily and conveniently used by the visually impaired. For example, in the exemplary embodiment, the automated banking machine may enable a consumer to repeat the last audible verbal instructions with the press of a single button and/or key. Also, for each key press or other input, the banking machine may be operative to audibly identify the letter, number, and/or function of the key.

In the exemplary embodiment, the automated banking machine may enable the consumer to cycle through a plurality of volume changes with the press of a single button and/or key. Further the banking machine may be operative to automatically mute any external loudspeakers of the banking machine upon the detection of the operative connection of headphones to the machine by a user. In addition, the exemplary embodiment of the banking machine may be operative to set the headphone volume at a pre-determined low level with each new consumer session. The consumer may then press the volume key and/or button to increase the volume level of the headphones to a desirable level.

The exemplary embodiment may include a new audio system which enables the automated banking machine to have one or more of the previously described audible features. The new audio system may be operative to accept and adjustably mix together inputs from a plurality of audio sources, including multimedia inputs such as MPEG streams, voice inputs such as from WAV files, and system keyboard and/or prompting beeps. An exemplary embodiment of the audio system may further include both external and headphone connection ports which are operative to individually and selectively amplify and output the mixed signals through external loudspeakers and headphones placed in operative connection with connection ports.

The audio system may be operative to detect the connection of a headphone to the headphone port, automatically mute the output to the external port which is connected with external speakers, and set the headphone volume at a minimum level. In addition, the exemplary audio system may be operative to detect the removal of the headphone from connection with the headphone port, and automatically reinstitute the output through the external port.

In the exemplary embodiment, the new audio system may further be operative to selectively step through a plurality of headphone volume levels responsive to one or more volume changing inputs. Such inputs may be directly received from a key or button in operative connection with the new audio system. In alternative exemplary embodiments of the audio system, signals corresponding to a volume change may be received from one or more buttons of the banking machine.

BEST MODES FOR CARRYING OUT INVENTION

Figure 1:
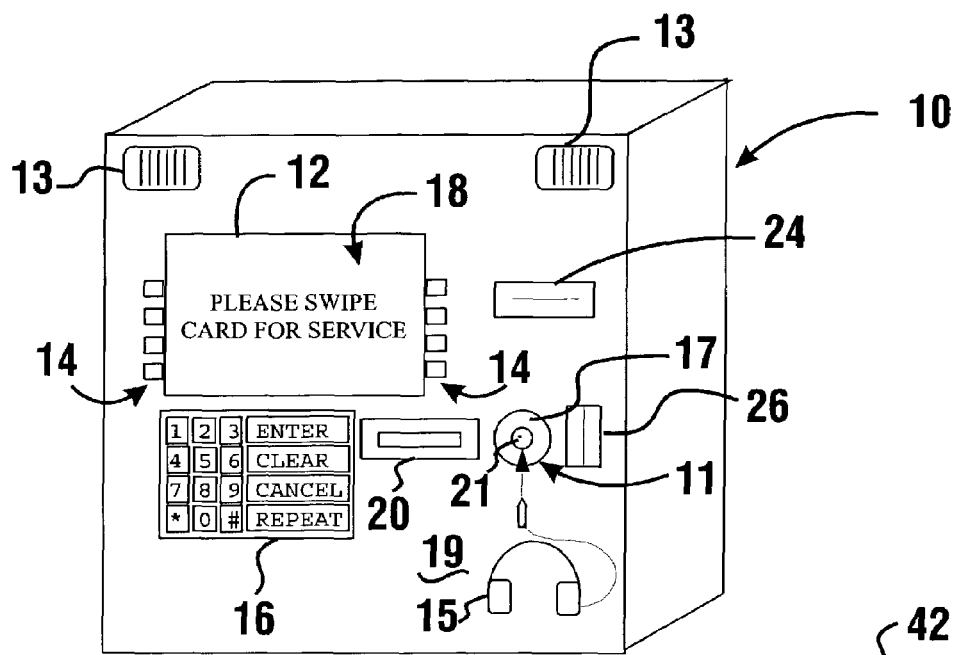
FIG. 1 is a perspective view representative of an exemplary embodiment of an ATM incorporating features of the present invention.

Referring now to the drawings and particularly to FIG. 1, there is shown therein a perspective view of an exemplary automated banking machine such as an ATM 10 including certain features of the present invention. The exemplary embodiment of the ATM 10 includes output devices such as a display device 12 and external loudspeakers 13. The display device 12 is operative to provide a consumer with a user interface 18 that includes a plurality of screens or other outputs including selectable options for operating the machine. The external loudspeakers 13 may be operative to provide a consumer with audible music, beeps, signals, and/or verbal instructions for operating the machine.

The exemplary embodiment of the ATM 10 may further include at least one input device such as an external port 11. In the exemplary embodiment of the ATM 10, the external port 11 includes a speaker port such a headphone port 21 for operatively connecting portable speaker devices such as a set of headphones 15 to the ATM. In other exemplary embodiments, the external port 11 may comprise a wireless connection port. For example in an alternative exemplary embodiment of the ATM 10, the external port 11 may include a wireless communication device which is operative to communicate with a wireless headphone set or other external device capable of providing audible, visual or other user perceivable outputs. Such wireless communication devices may communicate with the external device using RF or IR, for example.

In the exemplary embodiment, the external port 11 may include a base 17 with a useful shape that is not flush with the fascia 19 of the ATM 10. The shape of the base 17 may have a distinctive contour which enables a consumer with impaired vision to quickly locate the external port by touching the fascia 19 and base 17 of the ATM. For example in one exemplary embodiment, the base of the external port may include a concave portion with a female headphone jack or port 21 positioned generally in the center of the concave portion. In further exemplary embodiments, the base 17 of the external jack may extend from the fascia 19 and have a distinctive contour or edge shape such as that of a square, circle, triangle, or other unique shape that is identifiable by touch.

The exemplary ATM 10 may include a plurality of input devices such as function keys 14 and a keypad 16. The exemplary embodiment of the ATM 10 may further include other types of input devices, such as a touch screen, microphone, card reader 26, biometric reader or any other device that is operative to provide the ATM with inputs representative of user instructions or information. The exemplary ATM 10 may further include a plurality of transaction function devices, such as a sheet or cash dispenser 20, receipt printer 24 and other devices.

Figure 2:
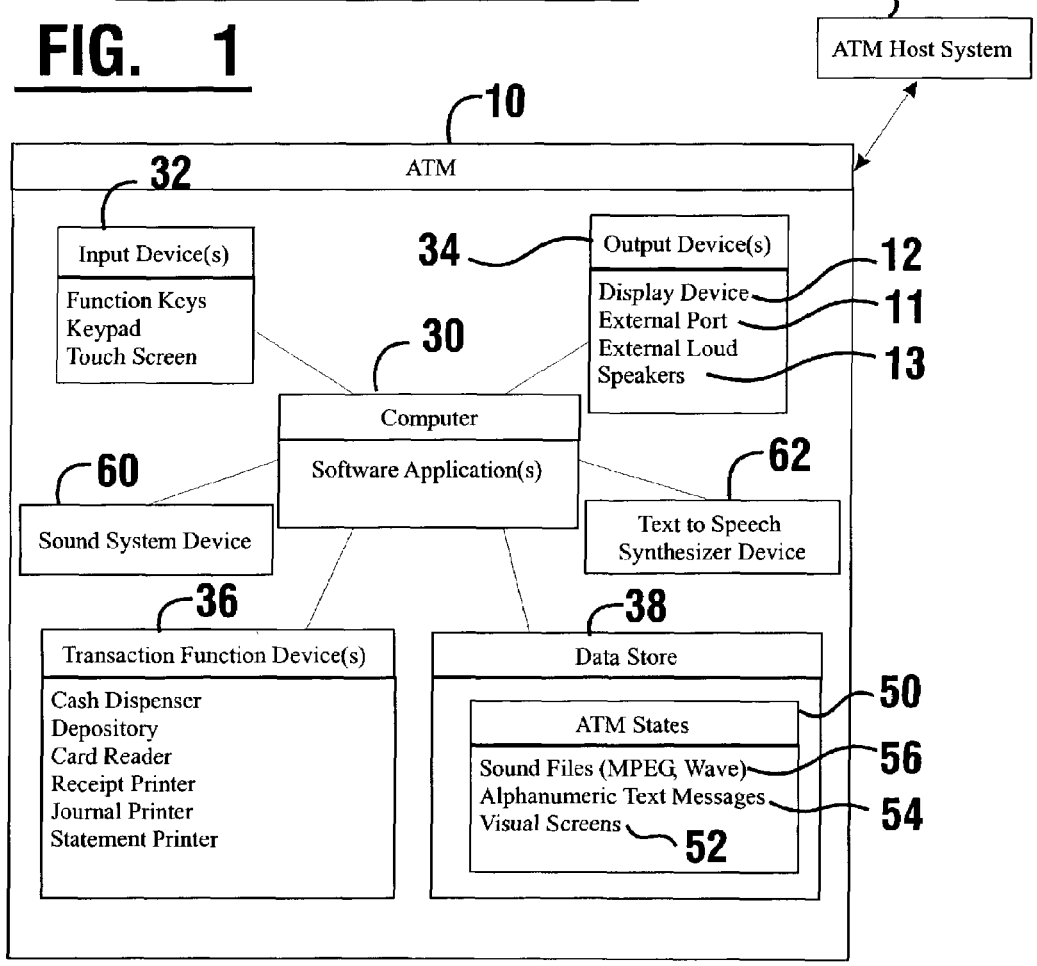
FIG. 2 is a schematic view of the exemplary embodiment of the ATM.

FIG. 2 shows a schematic view of components which may be included in an exemplary embodiment of the ATM and a system in which it is operated. The ATM 10 may include at least one computer 30. The computer 30 may be in operative connection with the input device(s) 32, the output device(s) 34, the transaction function device(s) 36 and at least one data store 38. The exemplary embodiment further includes one or more software application(s) 40 operative in the computer 30. The software applications may include for example terminal control software, maintenance software, diagnostic software and any other software that enables the ATM to perform transaction functions for users and/or enables authorized representatives of an operator of the ATM to service, configure and maintain the ATM. An exemplary embodiment of an ATM may be operative to communicate with a host banking system 42 to enable a consumer to perform such exemplary transaction functions as withdrawing cash from an account through operation of the cash dispenser device 20, depositing checks or other items with the depository device, performing a balance inquiry for a financial account and transferring value between accounts.

The exemplary embodiment may be operative to provide a consumer with a user interface that may be visually displayed and/or output in audible form for the consumer. The exemplary user interface may guide the consumer through the selection of one or functions which are to be performed by the ATM. Such functions may include a plurality of different transaction functions such as the dispense of cash, balance inquiries, deposits and transfers. However, such functions may also include options for navigating through the user interface such as functions for canceling or confirming a selection. Functions may also include options for configuring the user interface, such as changing the human language output through the user interface or changing the volume of the audio output of the ATM. In addition, functions may also include options for making the user interface more user friendly, such as functions that repeat an audible instruction, or that provide help or a description for other functions of the ATM.

The exemplary embodiment of the ATM includes at least one software application such as a terminal control software program that at any given time is operative to be in one of a plurality of different states. To perform transaction functions, the terminal control software may progresses between the various states, prompting the user to input different types of information in some states and performing a transaction function in other states in response to the inputted information.

The exemplary embodiment of the ATM may operate to organize different transaction functions into a hierarchy using a plurality of menus and sub-menus. A menu may be visually and/or audibly output to the consumer for each of the different states the ATM is operative to progress through to select and perform the transaction functions. Each menu may be operative to list those functions which may be performed in any given state of the ATM. Selecting an option or function visually listed or verbally described in a menu may cause the ATM to change to a different state which causes a display and/or output of an audible verbal description of a sub-menu of options or functions available to be performed by the ATM in the new state.

The exemplary data store 38 of the ATM may be operative to store therein, information for generating visual outputs and audible outputs that are representative of menus and sub-menus for a plurality of different states 50 of the ATM. Such information for example may include stored data for producing visual outputs such as visual screen data 52 for operative states of the ATM. Such information may further include stored data for producing audio outputs such as MPEG or WAV sound files 56 which include verbal instructions for operative states of the ATM. Such stored data for producing audio outputs may also include alphanumeric text messages 54 which may be used by the computer 30 to generate audible verbal instructions for operative states of the ATM. In exemplary embodiments, the visual screen data 52 and/or text messages 54 may be accessed by the computer and used to produce visual outputs through the display device 12. The sound files 56 and/or text messages 54 may be accessed by the computer and used to produce audible outputs with verbal instructions or descriptions through external loudspeakers 13 and/or headphones.

As shown in FIG. 2, the ATM 10 may further include a sound system device 60 in operative connection with the computer. The exemplary sound system device 60 may be operative to produce signals that produce audible outputs. Such signals may be directed to the external port 11 and/or the external loudspeakers 13. In one exemplary embodiment, the sound system device may be operative to selectively mix and amplify a plurality of different audio input signals to generate an amplified audible output signal. Alternative exemplary embodiments of the ATM 10 may further include a text to speech synthesizer device 62 which is operative to convert the text messages 54 into the verbal instructions or descriptions included in the audible outputs of the ATM.

The exemplary embodiment of the ATM 10 may be designed to be used by consumers with normal vision as well as users who have impaired vision or who are blind. For example, a user with normal vision may view the display screen to read instructions for operating the ATM 10. A user with impaired vision may listen to verbal instructions and descriptions output from the external loudspeakers 13. In addition, a user with impaired vision may operatively connect a personal set of headphones 15 or other device with the external port 11 of the ATM to listen to verbal instructions and descriptions in private.

In an exemplary embodiment, the sound system device 60 may be operative to detect the impedance change across the external port 11 when headphones 15 are electrically connected to the external port. When the connection is detected, the sound system device 60 and/or computer 30 may be operative to mute any audible output being directed to the external loudspeakers 13. The computer may then be operative to output private verbal instructions through the headphones which describe to the user how the ATM may be operated. In exemplary embodiments, muting an audible output may include the computer or the sound system device operating to lower the volume level of the audible output through the external speakers to a generally silent level. Muting an audible output may also include stopping the playing or production of audio outputs by the computer or the sound system device.

Upon detection of the connection of the headphones or other external device to the external port, the sound system and/or the computer may be operative to change the volume level of the audible output being directed to the headphones or other device through the external port to a predetermined level. Such a predetermined level may correspond to a relatively low volume level that is not likely to cause discomfort to the majority of consumers using the ATM. In the exemplary embodiment, the sound system may be in operative connection with one or more volume changing switches, keys, or buttons which are accessible to the consumer. After the operative connection of the headphones or other device to the external port, the volume changing buttons may be operated by the consumer to increase or decrease the volume level as desired by the consumer. In an exemplary embodiment, the sound system device may further be operative to detect when the headphone has been disconnected with the external port. When this occurs the sound system and/or the computer may be operative to mute the audible output to the external port and institute the audible output through the external loudspeakers.

In alternative exemplary embodiments, a key of a keypad of the ATM may be operative to control the volume of audio outputs. When a designated volume key of the keypad or other key is pressed or actuated, the computer may be operative to cause the ATM to change the current volume level and audibly output a word such as "Volume" at the newly selected volume level. For example, when a consumer presses the volume key of the keypad twice in succession, an exemplary embodiment of the banking machine may be operative to output the word "Volume" twice with the second occurrence of the word 'Volume' being louder than the first occurrence. When the volume has reached a maximum level, the next time the volume key of the keypad is pressed, the exemplary ATM may be operative to return the volume level to a predetermined minimum usable volume level and output a word such as 'Volume' at the corresponding minimum volume level.

Figure 3:
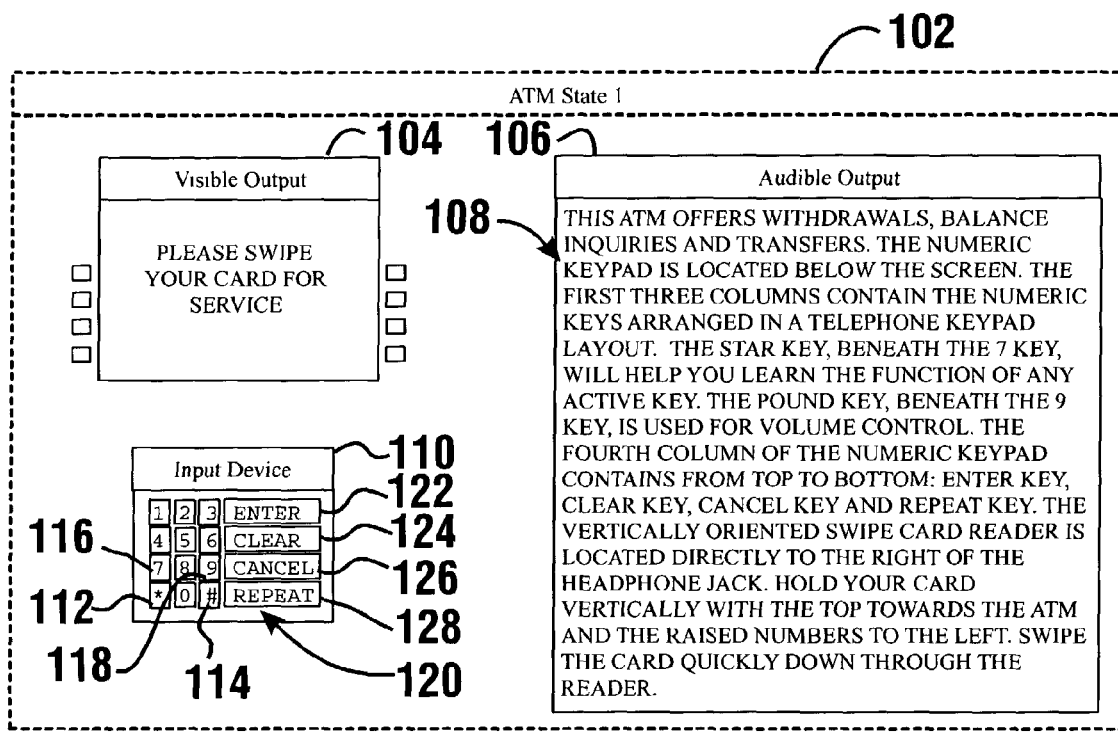
FIGS. 3-13 are schematic views of the exemplary embodiment of the ATM in a plurality of different states of operation.

FIGS. 3-8 show schematic views of the ATM 10 in a plurality of different states. Such states are examples of one exemplary path a consumer may take through the hierarchy of user interface menus for purposes of operating the ATM 10. FIG. 3 shows the ATM 10 in a first mode or state 102 which may be active when a user first approaches the machine. Here the ATM is operative to attract or invite consumers to use the services of the ATM. The exemplary embodiment of the ATM may include a visible output 104 through a display device of the ATM. The visible output may include indicia such as text which informs the consumer that the card may be swiped for initiating operation of the machine.

For users that are visually impaired, the exemplary ATM may further be operative to output an audible output 106 through external loudspeakers or headphones of the consumer. Such an audible output 106 may include verbal instructions 108 which inform the consumer which types of transaction functions can be performed at the machine. The verbal instructions 108 may also describe the locations of input devices such as a keypad 110 of the ATM and may describe the physical locations and/or configurations of the input devices. In addition the output verbal instructions may describe how the input device may be manipulated to select different functions of the machine and may further describe what the functions perform. Also, the verbal instructions may describe the location of transaction function devices and describe how the transaction function devices may be used.

For example in the state shown in FIG. 3, the output audible verbal instructions may indicate that the ATM offers transaction functions such as withdrawals, balance inquiries and transfers. In addition the verbal instructions may indicate that the keypad 110 is located below the display screen. Further, the verbal instructions may indicate that the keypad is organized similar to a telephone keypad. Also, the verbal instructions may describe the locations of certain keys of the keypad, including their function. For example, the star "*" key 112 may be indicated to be below the seven "7" key 116 and is operative to help the consumer learn the function of any active key. The pound "#" key 114 may be indicated to be below the nine "9" key 118 and is used for volume control. A fourth column 120 of keys in the exemplary keypad may be described as including from top to bottom an enter key 122, a clear key 124, a cancel key 126, and a repeat key 128. The exemplary output verbal instructions 108 may further indicate that the swipe card reader is vertically orientated and is located to the right of the headphone jack. Exemplary audible outputs may also indicate that the swipe reader is to be used by holding a credit or debit card vertically with the top toward the ATM and with the raised numbers to the left and by swiping the card quickly down through the slot in the reader. Of course these outputs are exemplary and in other embodiments other approaches may be used.

Figure 4:
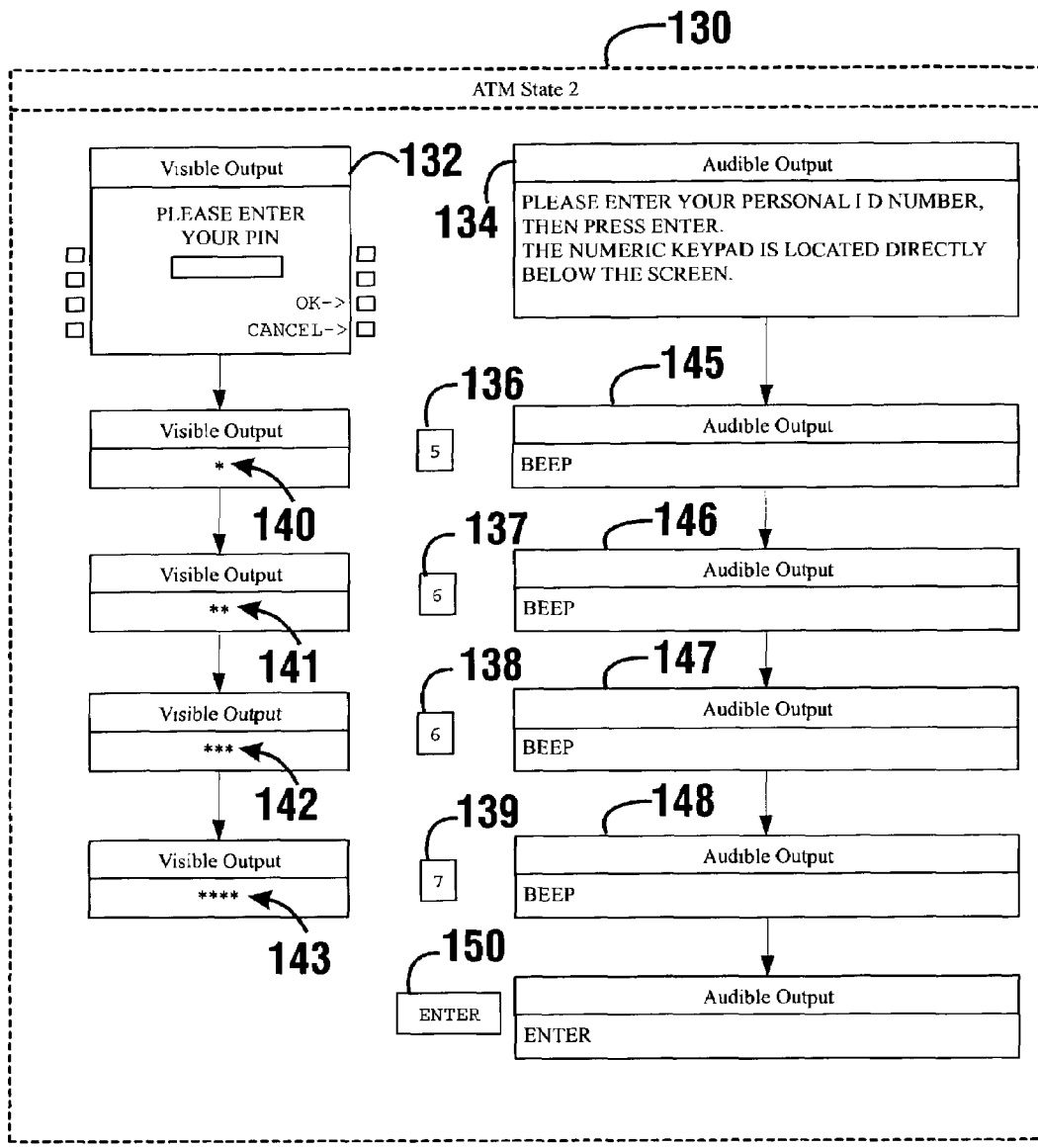

As shown in FIG. 4, the exemplary ATM may be operative to change to a second state 130, after the consumer successfully swipes and/or inserts a card using the card reader of the ATM. In this second state 130, the ATM may be operative to accept the input of a Personal Identification Number (PIN). Both the visible output 132 and the audible output 134 produced when the ATM is in this state, may request that the consumer enter a PIN. As a consumer presses each of the numeric keys 136-139 of the keypad which correspond to the consumer's PIN, the exemplary ATM may be operative to both visually and audibly acknowledge each input. For example the visible output 132 may be updated with each key press to display an additional asterisk symbol 140-143. In addition, with each key press the ATM may be operative to produce additional audible outputs 145-148 which may include a beep, or other sound acknowledging each input. When the audible output is privately being communicated to the user through headphones for example, the audible outputs 145-148 may correspond to the verbal description of each number being pressed. When the user presses the enter key 150, the exemplary ATM is operative to produce a further audible output which includes a verbal description representative of the enter key such as for example the word "ENTER."

Figure 5:
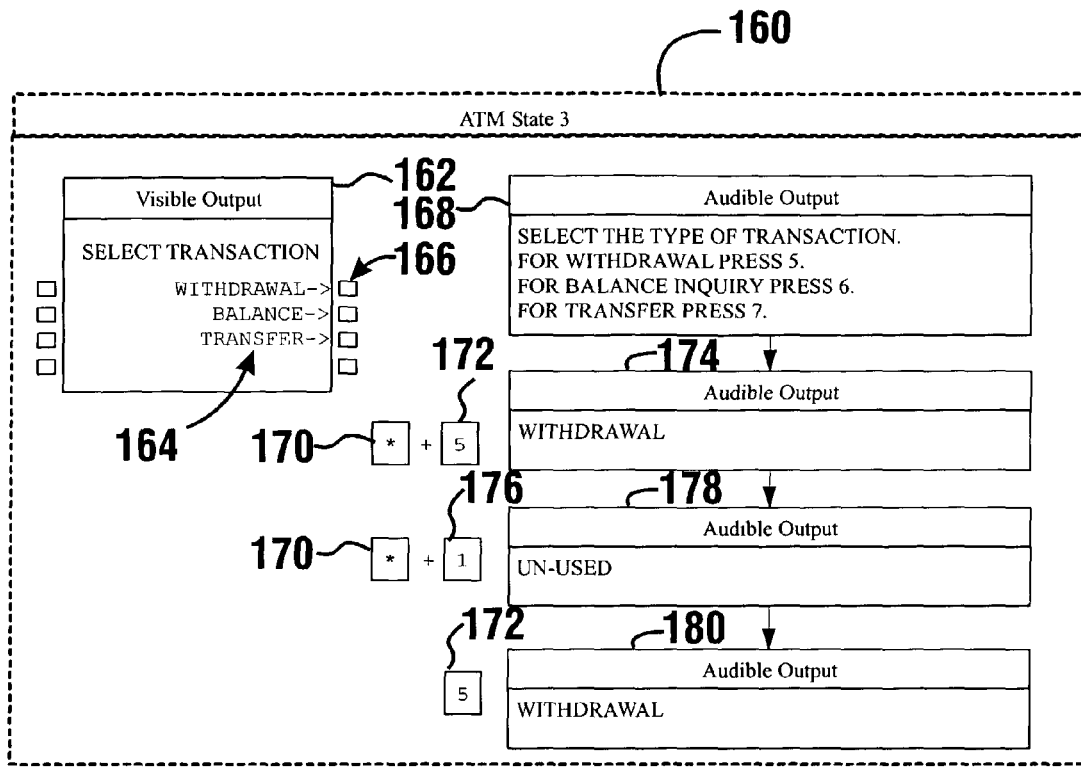

Once the consumer inputs a PIN and presses the enter key 150 of the keypad, the exemplary ATM may be operative to change to a third state in which the ATM is operative to enable the consumer to select one of a plurality of transaction functions to be performed with the ATM. As shown in FIG. 5, when the ATM is in a third state 160 the ATM may produce a visible output 162 which lists the transaction functions 164 and visually points to the function keys 166 that are operative to select each transaction function.

In the exemplary ATM, this described third state may cause the computer in the ATM to produce audible outputs 168 which describe which keys of the keypad are operative to select certain transaction functions. For example, in this described embodiment it may be indicated that the five "5" key may be actuated to select a withdrawal, the six "6" key may be actuated to select a balance inquiry, and the seven key "7" may be actuated to select a transfer.

In the exemplary embodiment, the ATM may be operative to provide a consumer with help to learn which keys perform which functions. For example, if the consumer wishes to verify that the five "5" key corresponds to a withdrawal transaction function without actually selecting a withdrawal transaction function, the consumer may press the star "*" key of the keypad prior to pressing the five "5" key. In this described exemplary embodiment the star "*" key may indicate to the ATM that the next following key is to be verbally described or named. As shown in FIG. 5, when the consumer presses the star "*" key 170 followed by the five "5" key 172, the ATM may be operative to produce a further audible output 174 which verbally indicates the name of the function such as "Withdrawal." When a help key such as the star "*" key 170 is actuated in this embodiment, the ATM may only describe the function associated with the next key press rather than changing to a further state corresponding to such a key press.

If the consumer presses the star "*" key 170 followed by a key that is not associated with a function in the current state, such as the one "1" key 176, the exemplary ATM may be operative to produce a further audible output 178. The further audible output may verbally indicate that the key is not being used in the current state of the ATM with an expression such as "Un-used."

In an exemplary embodiment, the second key for which the user wishes to receive an indication of the function must be pressed within a predetermined time period after the star "*" key 170 is pressed. Such a time period may for example be ten seconds. Of course these approaches are exemplary and in other embodiments other approaches may be used.

Figure 6:
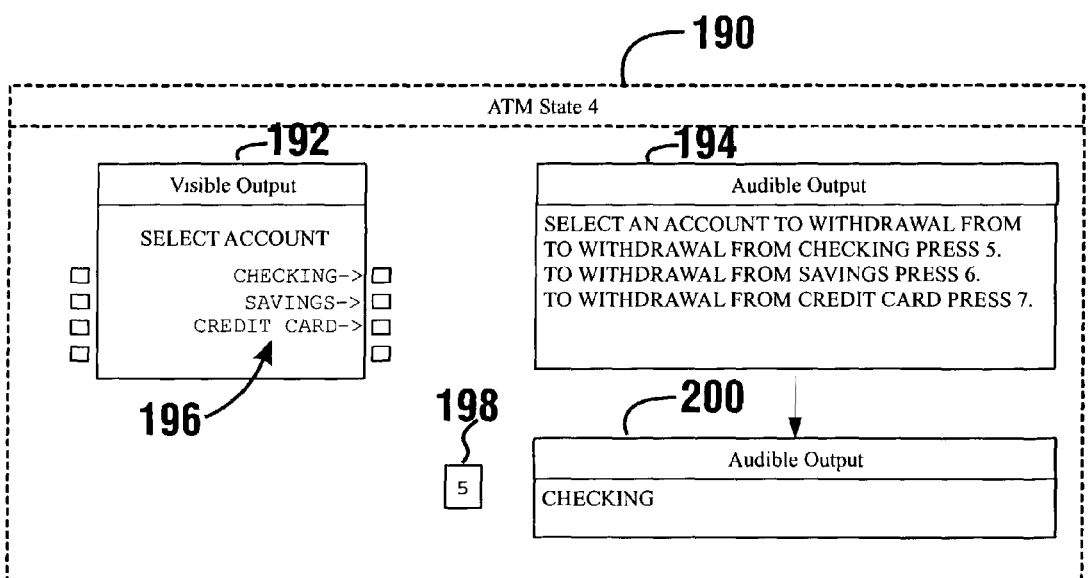

In the exemplary embodiment, when a consumer selects a transaction by pressing a key associated with the transaction, such as the five "5" key 172 without pressing the star "*" key 170, the ATM may be operative to change to a fourth state and produce another audible output 180 which verbally indicates to the user the name of the selected function. As shown in FIG. 6, the fourth state 190 may include a verbal and an audible request that the consumer select or input additional information associated with the performance of the selected transaction function. With a withdrawal transaction, the fourth state may include a visible output 192 which lists the type of accounts 196 that the consumer may select for purposes of making the withdrawal. An audible output 194 may likewise verbally output a list of the types of accounts along with a corresponding key of the keypad to press for selecting each account. As discussed previously, when the consumer selects a key, the exemplary ATM may be operative to produce a further audible output 200, which verbally describes what the consumer has selected. For example, if the consumer presses the five "5" key 198, the audible output 200 may indicate the name of the selection by outputting a word such as "Checking."

Figure 7:
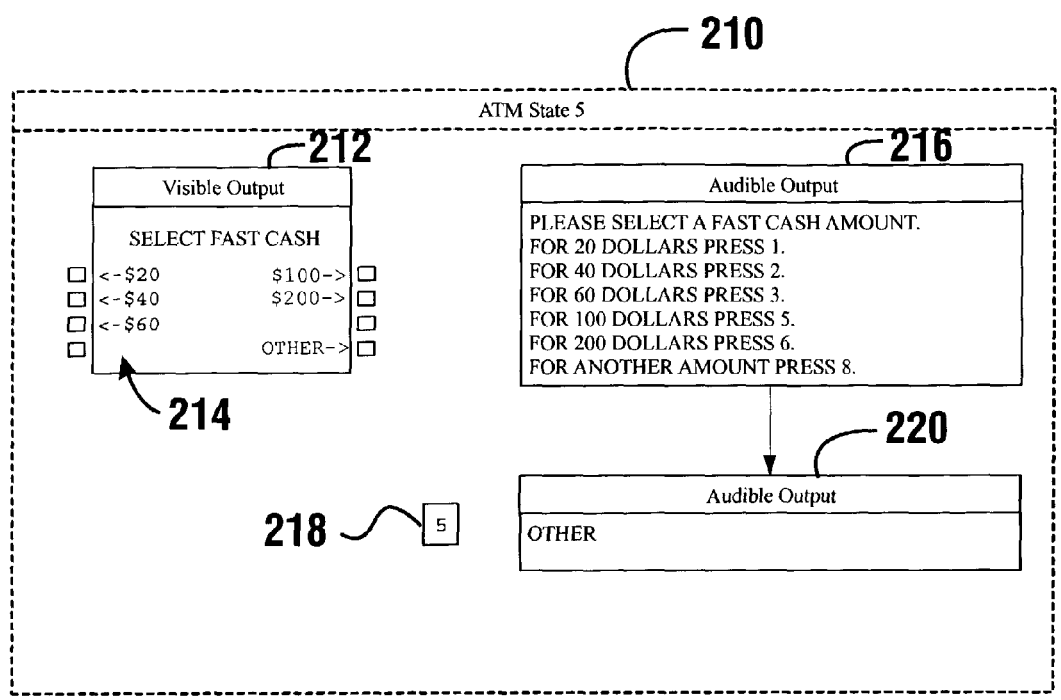

For a withdrawal transaction function, the exemplary embodiment may change to a further state after a selection of an account has been made. FIG. 7 shows an example of a fifth state 210, in which the ATM may be operative to accept the selection of an amount of cash to be withdrawn. Here the ATM may be operative to produce a visible output 212 which lists a plurality of currency amounts 214 which may be selected. Likewise, the ATM may be operative to produce an audible output 216 which verbally indicates which keys of the keypad to press in order to select a particular currency amount.

Figure 8:
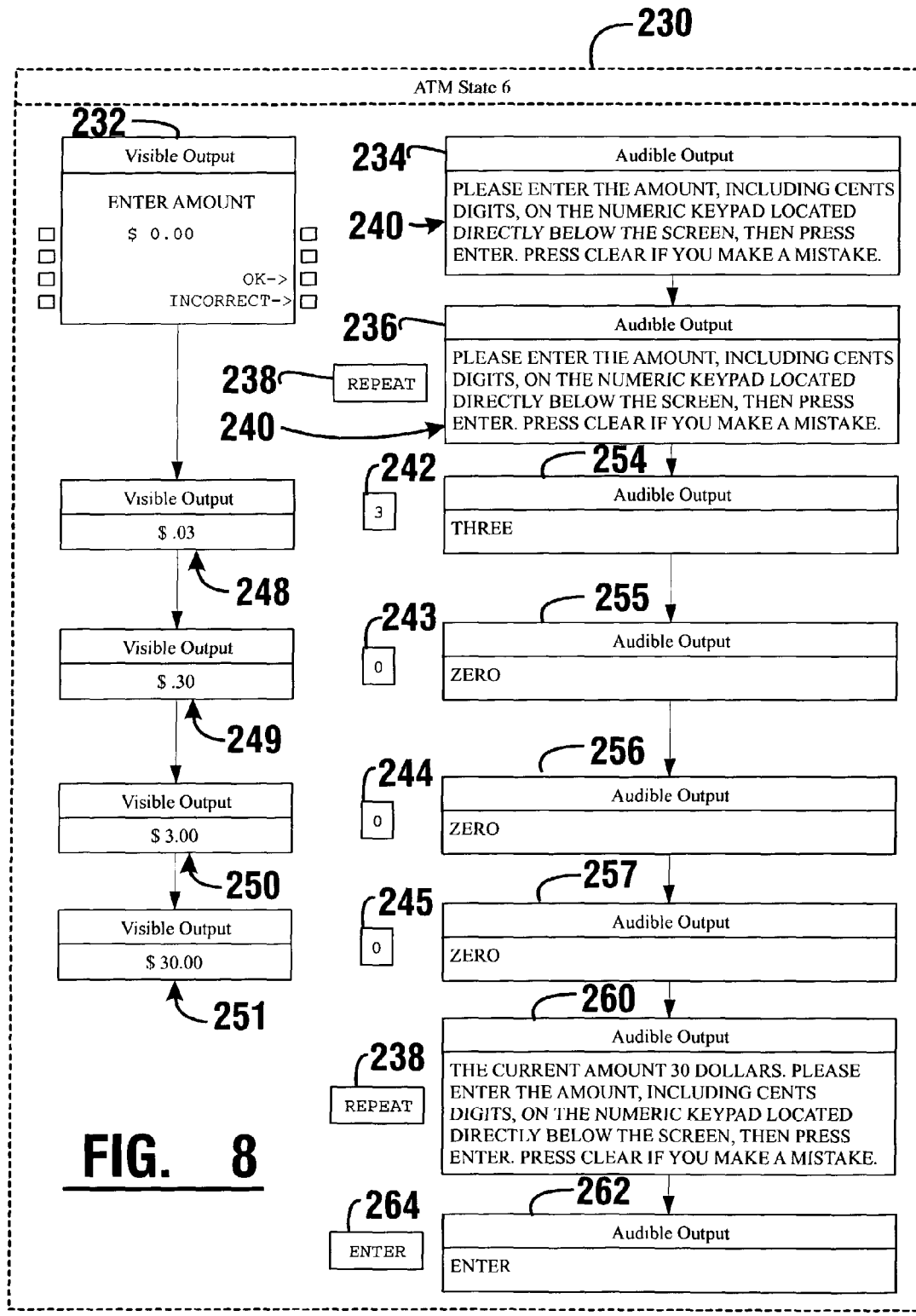

In this described exemplary embodiment, the five "5" key 218 corresponds to the selection of another amount for a withdrawal. When this key is pressed, while the ATM is in the fifth state, the ATM is operative to cause the ATM to change to a sixth state and is operative to produce a further audible output 220 which verbally describes this selection with a word such as "Other." As shown in FIG. 8, when the exemplary ATM is in a sixth state 230, the ATM may be operative to enable the consumer to enter a specific amount of cash to withdraw, which amount may be other than one of the predetermined amounts previously presented. Here the ATM may be operative to produce a visible output 232 which requests that the consumer enter an amount for the withdrawal in a currency such as dollars. The exemplary ATM may further be operative to produce an audible output 234 which verbally requests that the consumer enter an amount which includes a fractional currency portion such as cents on the keypad.

If for some reason the consumer did not hear or understand all of the verbal instructions 240 of the audible output 234, the exemplary ATM may be operative to enable the consumer to cause the ATM to repeat the verbal instructions 240. In an exemplary embodiment, the ATM may be operative to produce a further audible output 236 which includes a repeat of the verbal instructions 240 responsive to the consumer pressing a repeat key 238 of the keypad. If the repeat key is pressed before the verbal instructions 240 in the audible output 234 have completed, the exemplary ATM may be operative to interrupt the audible output 234 and immediately begin outputting the further audible output 236. The further audible output 236 may then repeat the verbal instructions 240 from the beginning. In other exemplary embodiment, the ATM may be operative to produce further audible outputs 236 which include a repeat of the verbal instructions 240 responsive to actuation of any un-used key of the keypad which is not associated with another function or a selection available in the current state of the ATM.

When the consumer enters an amount of a withdrawal by pressing the number keys 242-245, the exemplary embodiment of the ATM may be operative to update the visible output 232 to produce visual outputs 248-251 with indicia representative of the current amount entered. In addition the ATM may be operative to produce further audible outputs 254-257 which verbally describe the number associated with the key that was pressed. In the exemplary embodiment, as each key is pressed, the ATM may be operative to determine a new current amount of value. The last two keys pressed may correspond to the fractional portion of the amount such as the cents portion in U.S. currency. The current amount may be stored in a memory or buffer in operative connection with the computer of the ATM. Pressing the repeat key 238 while a withdrawal amount has been or is being entered, may cause the ATM to produce a further audible output 260 which verbally indicates the current amount stored in the memory of the ATM. In an exemplary embodiment, the audible output 260 may also include a repeat of the verbal instructions 240.

Figure 9:
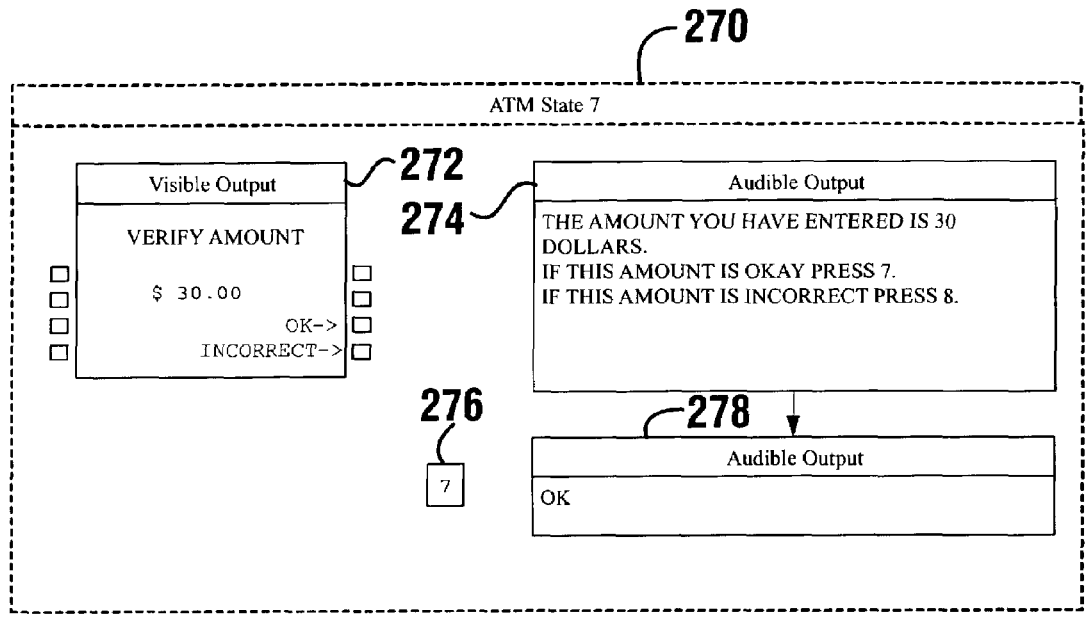

When the consumer has completed entering an amount, the consumer may press the enter key 264. Pressing the enter key may cause the ATM to change to a seventh state and produce another audible output 262 which verbally describes that the enter key has been pressed. FIG. 9 represents the ATM in a seventh state 270. Here the exemplary embodiment of the ATM may be operative to produce a visible output 272 which requests that the consumer verify that the amount entered in the preceding state is correct. The ATM may also be operative to produce an audible output 274 which verbally indicates the current amount entered and requests that the consumer press keys of the keypad to verify that the amount is either correct or incorrect. In this described exemplary embodiment, the consumer may verify the amount by pressing the seven "7" key 276 of the keypad. When the seven "6" key is pressed, the ATM may be operative to produce an audible output 278 that verbally indicates a description of the selection by outputting a word such as "Ok."

Figure 10:
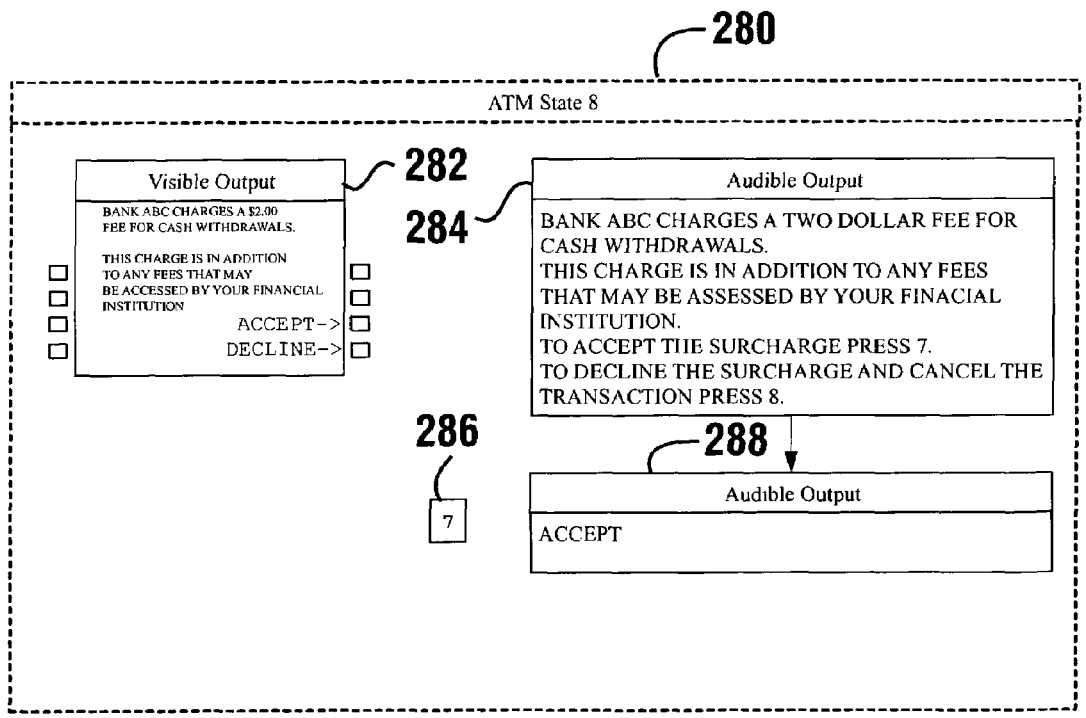

Once an amount has been verified by the consumer, if the ATM is configured to charge a surcharge for the transaction, the ATM may change to a further state such as the eighth state 280 shown in FIG. 10. Here the exemplary ATM may be operative to produce a visible output 282 which discloses the fee for the withdrawal and requests that the user accept or decline the surcharge. The ATM may further be operative to produce an audible output 284 which verbally describes the fee and indicates which keys of the keypad may be pressed in order to accept or decline the surcharge.

Figure 11:
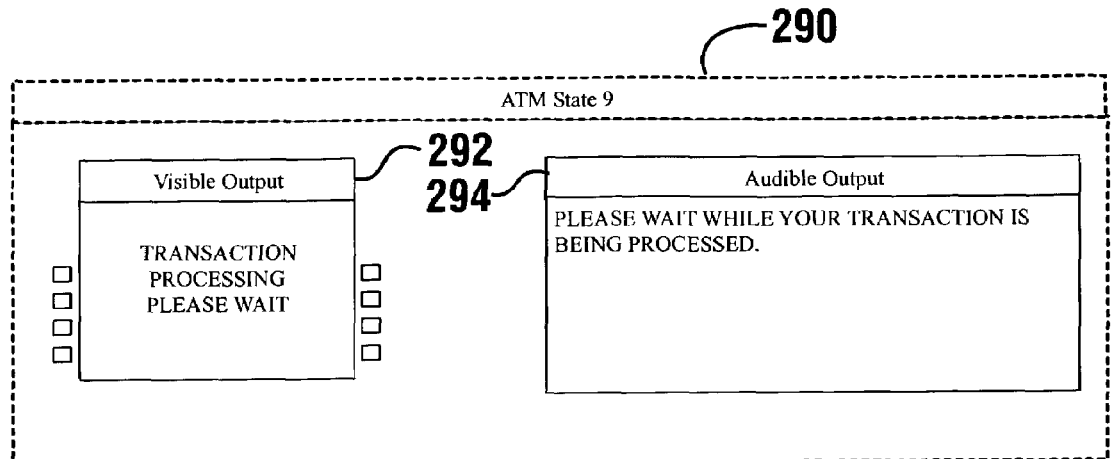
Figure 12:
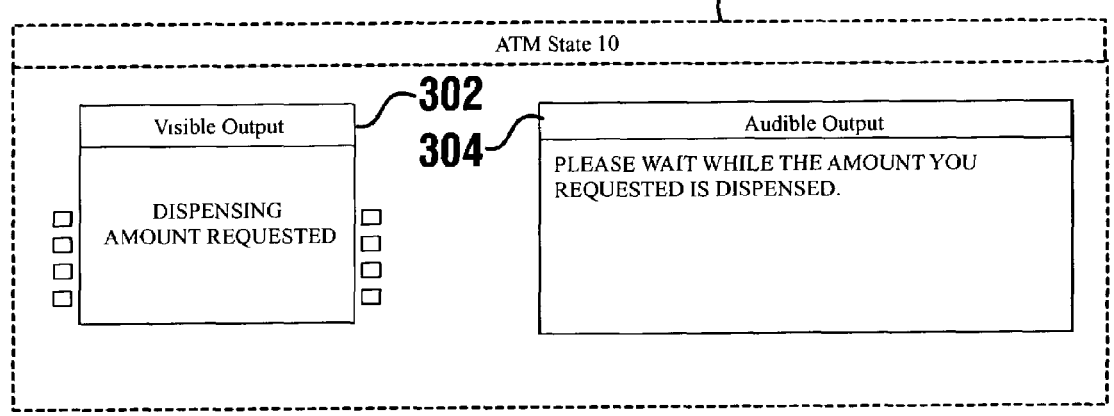

If the consumer accepts the charge by pressing the seven "7" key 286 for example, the ATM may be operative to produce the further audible output 288 which verbally indicates that the user has accepted the surcharge by outputting a word such as "Accept." Once a consumer has accepted the surcharge (if applicable for the transaction), the exemplary ATM may be operative to change to a ninth state 290 represented in FIG. 11 in which the ATM produces both a visible output 292 and an audible output 294 which indicates that the transaction is being processed. Once the withdrawal has been authorized, the ATM may be operative to change to a tenth state 300 represented in FIG. 12. In this state the exemplary embodiment of the ATM may produce both a visible output 302 and an audible output 304 which indicate that the ATM is in the process of dispensing the requested amount.

Figure 13:
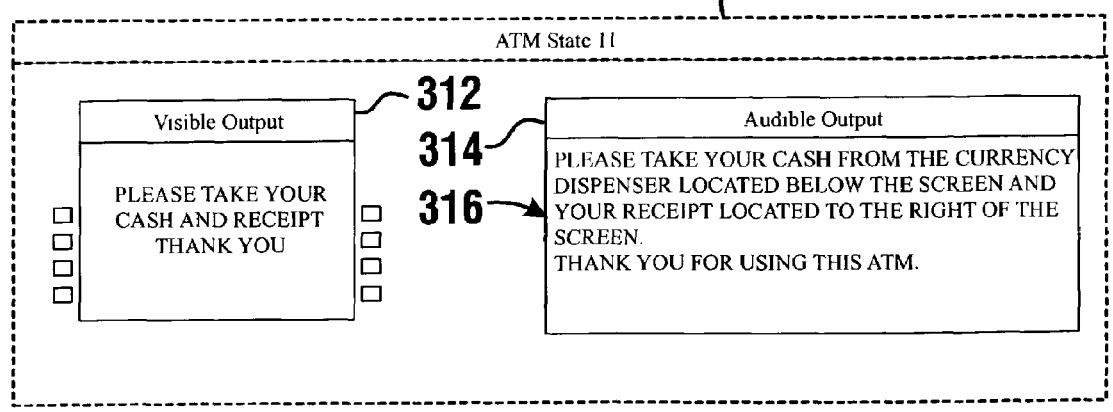

Once the exemplary embodiment of the ATM has dispensed an amount of cash with the cash dispenser that corresponds to the requested amount, the ATM may be operative to change to an eleventh state 310 as represented in FIG. 13. In the eleventh state the ATM may be operative to produce both a visible output 312 and an audible output 314 which indicate that the consumer may take the dispensed amount of cash and a receipt from the ATM. In addition, the verbal instructions 316 of the audible output may further describe the locations of the opening through which cash is delivered and the opening through which a receipt is delivered on the ATM.

Once the transaction function has been completed, the exemplary embodiment of the ATM may return to a previous state such as the described third state 160 shown in FIG. 5 for selecting another transaction or the described first state 102 shown in FIG. 3 for attracting new consumers. It is to be understood that the described ATM states, visible outputs, and audible outputs are examples of performing only one type of transaction with the exemplary embodiment. Other transaction functions for the described ATM and alternative exemplary embodiment of the ATM may have additional and/or other types of ATM states, visible outputs, and audible outputs.

In some exemplary embodiments, pre-existing ATMs which do not offer a user interface for the visually impaired may be upgraded to include some or all of the previously described features. Such an upgrade may include installing new terminal control software that is operative to cause the computer to direct the previously described audible outputs through a sound system device of the ATM. Such upgraded terminal control software may further be operative to cause the ATM to repeat verbal instructions, provide verbal help for selections, and/or change the volume of the audible output as described previously.

Figure 14:
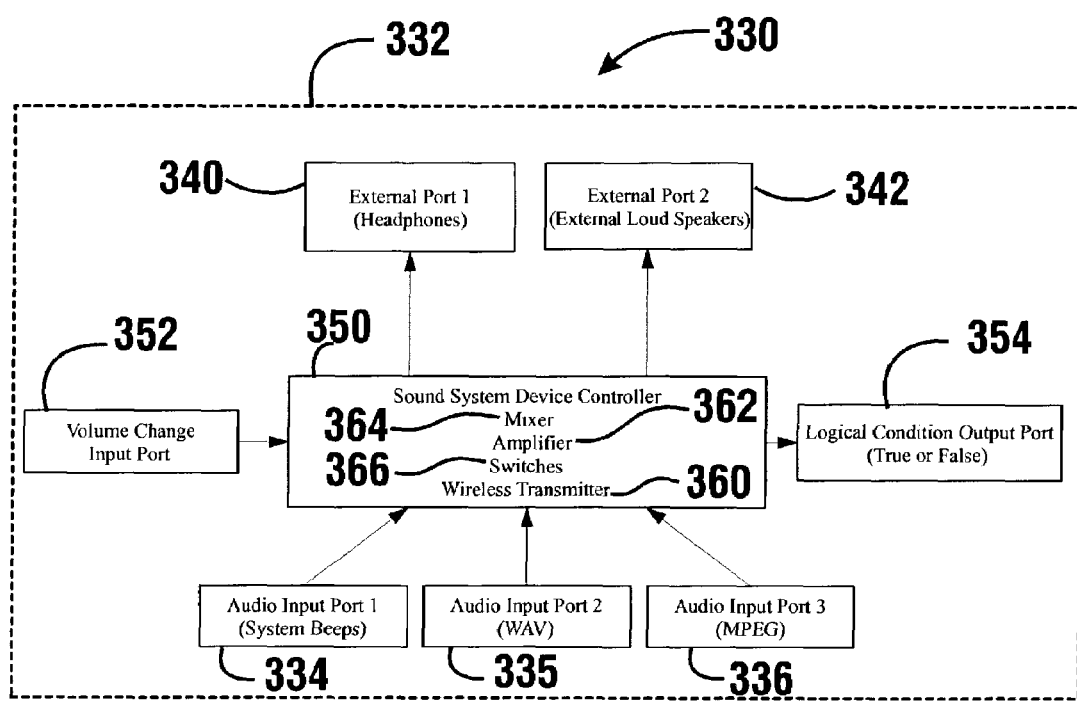
FIG. 14 is a schematic view representative of an exemplary audio system.

In addition such an upgrade of a pre-existing ATM may include the installation of an audio system that is operative to further enable an ATM to have some or all of the previously described features. FIG. 14 shows an example of an audio system 330 which is adapted to provide an ATM with support for headphones 340 using an exemplary embodiment of a sound system device 332. The sound system device 332 may be adapted to accept one or more audio signals through audio input ports 334-336. Such input ports may be connected to the output ports of one or more audio output devices of the ATM. For example such audio output devices of an ATM may include a sound card that is operative responsive to operation of the computer associated with the ATM to produce sound signals from WAV or MPEG files. In addition the ATM may include audio output devices for generating audio signals with beeps and other prompting sounds to assist a consumer in operating the ATM. Also the exemplary ATM may include a text-to-speech synthesizer audio output device which is operative to produce audio signals with verbal instruction responsive to alphanumeric text-based instructions included in visual display outputs.

The exemplary sound system device 332 may include a controller 350 that is operative to manipulate one or more audio signals individually through the audio input ports 334-336. The controller 350 may include an amplifier 362 and mixing circuits 364 which are operative to selectively amplify and mix the audio input signals together to produce one or more amplified audio signals. Such amplified audio signals may be selectively directed by the controller 350 through one or more of the external ports 340, 342 of the sound system device. In an exemplary embodiment, the external ports 340, 342 correspond to speaker ports that are adapted to releasably connect to headphones and external loudspeakers. In the exemplary embodiment, the sound system device 332 may include one or more selectable adjustable switches 366 such as jumpers, dip switches, or other electronic switches which can be configured to set relative amplification and other characteristics for mixing one or more audio signals received from the audio input ports 334-336.

In an exemplary embodiment of the sound system device 332, the controller may be in operative connection with a volume change input port 352. The volume change input port 352 may be operative to receive electrical signals responsive to the operation of one or more volume controls such as a momentary switch, key, button or other consumer accessible switch. The controller 350 may be configured to cycle through one of a plurality of volume levels responsive to the electrical signals received from the operation of the volume control. The controller 350 may be operative to amplify the amplified audio signals responsive to the currently selected volume level. When the volume level reaches a maximum level, the exemplary controller may be operative to change the volume level to a predetermined minimum level responsive to the next electrical signal received from operation of the volume control.

In this described exemplary embodiment, the ATM may include a volume control such as a button adjacent the keypad which is in operative connection with the volume change input port 352 of the sound system device 332. However, in other exemplary embodiments, the controller may be operative to receive volume changing signals from the computer of the ATM. Terminal control software may be configured to detect events such as the clicking of a pound "#" of the keypad and cause the computer to output a volume changing signal to the sound system device.

As discussed previously, the sound system device may be operative to mute amplified audio signals being directed through the external port 342 for external loudspeakers, responsive to the sound system device detecting the connection of headphones to the external port 340 for headphones. In an exemplary embodiment the controller 350 may be operatively configured to detect the impedance change across the external port 340 when headphones are electrically connected to the external port. In the exemplary embodiment when the connection is detected, the controller 350 may be operative to switch off any amplified audio signals being directed to the external port 342 for the external loudspeakers.

In addition, upon detection of the connection of the headphones the controller 350 may be operative to change the volume level of the amplified audio signals being directed to the external port 340 for the headphones to a predetermined level selected from one of the plurality of volume levels produced by the sound system device. Such a predetermined level may be configured with a jumper, dip switch, or other selectable switch associated with the sound system device. The predetermined level for example may be set to a volume level that is loud enough to be capable of being heard by almost all consumers, but is sufficiently low to be unlikely to cause discomfort to the majority of consumers using headphones with an ATM.

In the exemplary embodiment, the controller may further be operative to detect when the headphone has been disconnected from the external port 340 for the headphones. When this occurs the controller may be operative to mute the amplified audio signals to the external port 340 for the headphone and institute the delivery of the amplified audio signals to the external port 342 for external loudspeakers.

Also, in the exemplary embodiment, the controller 350 may be in operative connection with a logical condition output port 354 that is adapted to communicate with the computer. The controller 350 may be operative responsive to the detection of the headphones connected to the external port 340 for the headphones, to set the logical condition output port 354 to an electrical condition representative of true or on. When the controller 350 detects that the headphones are no longer connected to the external port 340 for headphones, the controller may be operative to set the logical condition output port 354 to an electrical condition representative of false or off.

In the exemplary embodiment, the computer of the ATM may be configured to poll or monitor the condition of the logical condition output port 354. The terminal control software may be configured to turn on or off audible outputs being directed to the audio input ports 334-336 of the sound system responsive to the current condition of the logical condition output port 354. Thus for example, when the headphones are not attached, the exemplary ATM may be configured to output system beeps and other prompting sounds through the external loudspeakers. However, when headphones are connected and the condition of the logical condition output port 354 changes to true or on, the exemplary terminal control software may be programmed to begin producing audio output with verbal instructions for operating the machine which is directed to the headphones.

IN further alternative exemplary embodiments, the sound system device may further include a wireless transmitter 360. Such a transmitter may be operatively configured to transmit a wireless audio signal through an external port of the sound system device. Such a wireless audio signal may be received by a wireless receiver of the consumer such as wireless headphones or other suitable external device usable by the consumer for receiving outputs from the ATM.

In alternative embodiments, the wireless audio signal may be encrypted by the ATM to minimize possible eavesdropping on the transaction by a third party. Such encryption may include a handshaking protocol between the ATM and the headphones or other wireless receiver device of the consumer which verifies that the consumer currently accessing the ATM is the only party that can decipher the audio signals in the wireless transmission from the ATM. For example, in one exemplary embodiment, wireless audio signals between the headphones and the ATM may be transmitted using wireless network technology such as BlueTooth or IEEE 802.11. In such embodiments, the ATM may output to each consumer within range of the ATM a verbal message which includes a unique session code. When the consumer has access to the machine, the consumer can enter their unique access code before entering a PIN. Based on the unique access code entered, the ATM may then direct the audio signals related to operating the ATM only to the set of wireless headphones which originally received the access code from the ATM.

In further exemplary embodiments, the ATM may be configured to direct private wireless audio signals to the headphones or other receiver device of the consumer based on information retrieved from the card or other input used to access the ATM by the consumer. For example, such information from or correlated with data on the card or other input may enable the ATM to retrieve or determine a private network address, encryption key, digital certificate, or other information associated with the headphones of the consumer, which may be used by the ATM to establish secure and private communications with head phones or other wireless devices of the consumer.

In further alternative exemplary embodiments, the handshaking protocol between the ATM and the wireless headphones or receiving device used by the consumer may be based on a biometric input received from the consumer currently accessing the ATM. Such biometric input for example may include a fingerprint scan, facial recognition system or other biometric scan of the consumer. The ATM may then selectively send private wireless audio signals only to that set of headphones which is operatively configured with information that corresponds to the biometric input corresponding to the particular user.

Thus the new automated banking machine audible user interface system and method of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:
1. A method comprising:
 a) detecting through operation of at least one computer a connection of a portable speaker device to an external port of an automated banking machine, wherein the automated banking machine includes at least one input device, wherein the at least one input device includes a keypad, wherein the keypad includes a plurality of keys including a first key;
 b) responsive to detecting the connection of the portable speaker device and a first state of a program operating in the at least one computer, causing the external port to produce a first audible output through the portable speaker device, wherein the first audible output includes first verbal instructions for operating the automated banking machine having the first state, wherein the first verbal instructions indicate that the volume level may be changed by actuating the first key of the keypad;
 c) receiving a first received input through operation of the keypad corresponding to an actuation of the first key; and
 d) performing a first function with the automated banking machine responsive to the first received input, wherein the first function includes changing a volume level at which further audible outputs are outputted through the portable speaker device.

2. The method according to claim 1, wherein after step (c) further comprising:
 e) producing a second audible output through the portable speaker device, wherein the second audible output includes a verbal description of the first received input.

3. The method according to claim 2, wherein in step (e) the verbal description includes at least one spoken word synonymous with the term "volume".

4. The method according to claim 3, wherein in step (e) the second audible output is directed through the portable speaker device at a changed volume level relative to an original volume level of the first audible output.

5. The method according to claim 3, wherein in step (a) the portable speaker device includes a headphone.

6. The method according to claim 1, wherein the first audible output is outputted in (b) at a first volume level, and further comprising:
   e) subsequent to (d), producing a second audible output through the portable speaker device, wherein the second audible output is outputted at a second volume level different from the first volume level responsive to (d).

7. The method according to claim 6, wherein in step (b) the first key corresponds to the pound "#" key of the keypad.

8. The method according to claim 1, wherein in step (a) the external port includes a base which is not flush with an adjacent fascia portion of the automated banking machine.

9. The method according to claim 1, wherein in step (b) the first verbal instructions further describe a location of the at least one input device on the automated banking machine.

10. The method according to claim 9, wherein in step (b) the first verbal instructions further describe a configuration of the at least one input device.

11. The method according to claim 9, wherein in step (b) the first verbal instructions further describe how to use the at least one input device.

12. The method according to claim 1, wherein in step (d) the first function includes producing a second audible output through the portable speaker device, wherein the second audible output includes a repeat of the first verbal instructions.

13. The method according to claim 12, wherein when step (c) occurs before the first verbal instruction has been completely output through the portable speaker device, step (d) includes interrupting the first audible output.

14. The method according to claim 1, wherein the first verbal instructions further direct a user to provide a first specified input through operation of the at least one input device, wherein the first audible output is output in (b) at a first volume level, and further comprising:
   e) receiving the first specified input through operation of the at least one input device;
   f) responsive to (e) placing the automated banking machine in a second state of the program;
   g) producing a second audible output through the portable speaker device responsive to the program having a second state, wherein the second audible output is outputted at a second volume level different from the first volume level responsive to (d), wherein the second audible output includes second verbal instructions for operating the automated banking machine, wherein the second verbal instructions direct the user to provide a second specified input through the at least one input device of the automated banking machine.

15. The method according to claim 14, wherein in step (e), the first specified input is generated responsive to operating a key of the keypad.

16. A method comprising:
   a) detecting through operation of at least one computer a connection of a portable speaker device to an external port of an automated banking machine, wherein the portable speaker device includes a headphone, wherein the automated banking machine includes at least one input device, wherein the at least one input device includes a keypad, wherein the keypad includes a plurality of keys including a first key; and
   b) responsive to detecting the connection of the portable speaker device and a first state of a program operating in the at least one computer, causing the external port to produce a first audible output through the portable speaker device, wherein the portable speaker device includes a volume level, wherein the first audible output includes first verbal instructions for operating the automated banking machine having a first state, wherein the first verbal instructions direct a user to provide a first specified input through an input device of the automated banking machine, wherein in step (b) the first verbal instructions indicate that the volume level may be changed by actuating the first key of the keypad;
   c) receiving a first received input through the input device, wherein the first received input includes actuation of the first key of the keypad;
   d) performing a first function with the automated banking machine responsive to the first received input, wherein the first function corresponds to changing the volume level of the portable speaker device; and
   d) producing a second audible output through a portable speaker device, wherein the second audible output includes a verbal description of the first received input, wherein the verbal description includes at least one spoken word synonymous with the term "volume".

17. Computer readable media bearing computer executable instructions operative to cause at least one computer in an automated banking machine to cause the automated banking machine to carry out a method comprising:
   a) detecting responsive to operation of the at least one computer, connection of a portable speaker device to an external port of the automated banking machine, wherein the automated banking machine includes at least one input device, wherein the at least one input device includes a keypad, wherein the keypad includes a plurality of keys including a first key;
   b) responsive to detecting connection of the portable speaker device and a program operating in the at least one computer having a first state, causing the external port to produce a first audible output through the portable speaker device, wherein the first audible output includes first verbal instructions for operating the automated banking machine with the program having the first state, wherein the first verbal instructions indicate that the volume level may be changed by actuating the first key of the keypad;
   c) receiving a first received input through operation of the keypad, wherein the first received input includes actuation of the first key; and
   d) performing a first function with the automated banking machine responsive to the first received input, wherein the first function includes changing a volume level at which further audible outputs are outputted through the portable speaker device.

18. A method comprising:
   a) detecting a connection of a portable speaker device to an external port of an automated banking machine;
   b) responsive to detecting the connection of the portable speaker device, enabling the automated banking machine to produce audible outputs through the portable speaker device which outputs include verbal information;
   c) causing the automated banking machine to operate to provide through the portable speaker device a first audible output with first verbal instructions, wherein the first verbal instructions indicate that an amount of value may be entered through operation of a keypad of the automated banking machine;

d) receiving through the keypad a first input, wherein the first input includes operating a first numeric key of the keypad;

e) responsive to (d), storing in a memory of the automated banking machine, data corresponding to a first amount of value, wherein the first amount of value corresponds to a first number associated with the first numeric key;

f) responsive to (d), causing the automated banking machine to operate to provide through the portable speaker device a second audible output, wherein the second audible output includes a verbal description of the first input, wherein the verbal description includes the first number associated with the first numeric key;

g) receiving through the keypad a consecutive input sequence of: a second input including operating a second key of the keypad that does not include the first numeric key; followed by a third input including operating the first numeric key; and h) responsive to (g), causing the automated banking machine to operate to produce a third audible output through the portable speaker device without storing in the memory an amount of value derived responsive to the third input, wherein the third audible output includes the verbal description of the first number associated with the first numeric key.

19. The method according to claim 18, further comprising:
i) receiving through the keypad a fourth input including operating a third key of the keypad, wherein the third key does not correspond to numeric keys of the keypad or the second key; and
j) providing through the portable speaker device a fourth audible output, wherein the fourth audible output includes a verbal statement that indicates the first amount of value.

20. The method according to claim 19, wherein the third key corresponds to a repeat key of the keypad.

21. The method according to claim 19, wherein the third key corresponds to an enter key of the keypad, and wherein the fourth audible output includes second verbal instructions requesting confirmation of the first amount of value by operating a fifth key of the keypad, and further comprising:
k) receiving through the keypad a third input including operating the fifth key of the keypad; and
l) performing a transaction function responsive to the first amount of value.

22. The method according to claim 21, wherein step (l) includes dispensing cash from a cash dispenser of the automated banking machine, wherein an amount of the cash corresponds to the first amount of value.

23. The method according to claim 22, further comprising:
m) providing through the portable speaker device a fifth audible output, wherein the fifth audible output includes third verbal instructions requesting that the dispensed amount of cash be taken.

24. The method according to claim 23, wherein in step (m) the third verbal instructions include a description of a location on the automated banking machine from which the dispensed amount of cash may be taken.

25. Computer readable media bearing computer executable instructions operative to cause at least one computer in an automated banking machine to cause the automated banking machine to carry a method comprising:
a) detecting a portable speaker device being operatively connected with an external port of the automated banking machine;

b) responsive to detecting connection of the portable speaker device, causing the automated banking machine to operate to produce audible outputs through the portable speaker device, which outputs include verbal information;

c) causing the automated banking machine to operate to provide through the portable speaker device, a first audible output which includes first verbal instructions, wherein the first verbal instructions indicate that an amount of value may be entered through operation of a keypad of the automated banking machine;

d) receiving through the keypad a first input, wherein the first input includes operating a first numeric key of the keypad;

e) responsive to (d), storing in a memory of the automated banking machine, a first amount of value, wherein the first amount of value corresponds to a first number associated with the first numeric key;

f) responsive to (d), causing the automated banking machine to operate to provide through the portable speaker device, a second audible output, wherein the second audible output includes a verbal description of the first input, wherein the verbal description includes the first number associated with the first numeric key;

g) receiving through the keypad a consecutive input sequence of: a second input including operating a second key of the keypad that does not include the first numeric key; followed by a third input including operating the first numeric key; and h) responsive to (g), causing the automated banking machine to operate to produce a third audible output through the portable speaker device without storing in the memory an amount of value associated with the third input, wherein the third audible output includes the verbal description of the first number associated with the first numeric key.

26. A method comprising:
a) detecting through operation of a computer in an automated banking machine a connection of a portable speaker device to an external port of the automated banking machine; and b) responsive to detecting the connection of the portable speaker device, causing the automated banking machine to operate to produce audible outputs through the portable speaker device which include verbal information;

c) causing the automated banking machine to operate to produce a first audible output through the portable speaker device, wherein the first audible output includes first verbal instructions for operating the automated banking machine, wherein the first verbal instructions direct a user to provide one of a plurality of inputs through at least one input device of the automated banking machine, wherein the plurality of inputs are associated with different functions of the automated banking machine;

d) detecting through operation of at least one computer a first input received through the at least one input device;

e) detecting through operation of the at least one computer a second input received through the at least one input device, wherein the second input corresponds to one of the plurality of inputs described in the first verbal instructions; and f) responsive to detecting the first input prior to detecting the second input, causing the automated banking machine to operate to produce a second audible output through the portable speaker device without causing the automated banking machine to perform a function associated with the second input, wherein the second audible output includes a verbal description of the function associated with the second input.

27. The method according to claim 26, wherein in step (d), the input device includes a keypad and the first input includes operating a first key of the keypad, wherein in step (e) the second input includes operating a second key of the keypad.

28. The method according to claim 27, wherein in step (c) the first verbal instructions indicate that verbal descriptions of each of the keys of the keypad may be obtained by operating the first key prior to operating a further key of the keypad.

29. The method according to claim 28, wherein in step (c) the first verbal instructions indicate a location of the first key on the keypad, wherein in step (d) the first key corresponds to a star "*" key of the keypad.

30. The method according to claim 28, wherein in step (c) the automated banking machine includes a program operating in the at least one computer, wherein the program is in a first state which causes the machine to be operative to accept an input of an amount of value with the keypad, wherein in step (e) the second key corresponds to a numeric key, wherein in step (f) the verbal description includes a number corresponding to the second key, wherein the automated banking machine does not store an amount of value in a memory of the automated banking machine responsive to the second input.

31. The method according to claim 28, wherein in step (c) the automated banking machine includes a program operating in the at least one computer, wherein the program is in a first state which causes the machine to be operative to enable the selection of one of a plurality of transaction functions to be performed with the automated banking machine, wherein in step (e) the second key is associated with the selection of a first transaction function, wherein in step (f) the verbal description includes a name of the first transaction function, wherein the program does not change to a second state associated with the first transaction function.

32. The method according to claim 31, wherein in step (e) the first transaction function corresponds to a withdrawal transaction function, wherein in step (f) the verbal description includes at least one spoken word representative of the function "withdrawal".

33. The method according to claim 27, wherein in step (f) when the second input does not corresponds to one of the plurality of inputs described in the first verbal instructions, the verbal description includes at least one spoken word representative of the term "un-used".

34. Computer readable media bearing computer executable instructions operative to cause at least one computer in an automated banking machine to cause the automated banking machine to carry out a method comprising:
a) detecting through operation of at least one computer in the automated banking machine a portable speaker device being in operative connection with an external port of the automated banking machine;
b) responsive to detecting the connection of the portable speaker device, causing the automated banking machine to operate to produce audible outputs through the portable speaker device which include verbal information;
c) causing the automated banking machine to operate to produce a first audible output through the portable speaker device, wherein the first audible output includes first verbal instructions concerning operation of the automated banking machine, wherein the first verbal instructions direct a user to provide one of a plurality of inputs through at least one input device of the automated banking machine, wherein the plurality of inputs are associated with different functions of the automated banking machine;
d) detecting through operation of at least one computer a first input received through the at least one input device;
e) detecting through operation of the at least one computer a second input received through the at least one input device, wherein the second input corresponds to one of the plurality of inputs described in the first verbal instructions; and
f) responsive to detecting the first input prior to detecting the second input, causing the automated banking machine to operate to produce a second audible output through the portable speaker device without causing the automated banking machine to perform a function associated with the second input, wherein the second audible output includes a verbal description of the function associated with the second input.

35. A method comprising:
a) detecting responsive to operation of at least one computer in an automated banking machine, operative connection of a portable speaker device to an external port of an automated banking machine, wherein the automated banking machine includes a keypad including a plurality of keys, wherein the plurality of keys includes a first key and a second key; and
b) responsive to detecting connection of the portable speaker device, causing the automated banking machine to operate to produce audible outputs through the portable speaker device which include verbal information;
c) operating a computer program in the at least one computer, wherein the program is capable of being in a plurality of states;
d) responsive to the program being in a first state, causing the automated banking machine to operate to produce a first audible output through the portable speaker device, wherein the first audible output includes first verbal instructions for operating the automated banking machine, wherein the first verbal instructions indicate which of the plurality of keys of the keypad are respectively associated with each of a plurality of different transaction functions the automated banking machine is capable of performing, and wherein responsive to the program being in the first state the automated banking machine is operative to enable selection of each of the plurality of transaction functions through actuation of different keys of the keypad, and wherein actuation of the second key of the keypad corresponds to selection of a first transaction function;
e) through operation of the automated banking machine, receiving inputs including a first received input including actuation of the first key of the keypad immediately sequentially followed by a second received input including actuation of the second key of the keypad;
f) responsive to (e), causing the automated banking machine to operate to produce a second audible output through the portable speaker device, wherein the second audible output includes a verbal description of the first transaction function, wherein during the second audible output the program remains in the first state;
g) through operation of the automated banking machine, receiving a third received input including actuation of the second key of the keypad, wherein the third received input does not immediately sequentially follow actuation of the first key of the keypad; and
h) responsive to (g), causing the automated banking machine to operate such that the program changes from being in the first state of the program to being in a second state of the program, wherein in the second state of the program the automated banking machine is operative to perform the first transaction function.

36. The method according to claim 35, and further comprising:
   i) responsive to (g) causing the automated banking machine to operate to produce a third audible output through the portable speaker device, wherein the third audible output includes a verbal description of the first transaction function.

37. The method according to claim 36, and further comprising:
   i) performing the first transaction function with the automated banking machine, including operating a first transaction function device of the automated banking machine.

38. The method according to claim 37, wherein in step (j) the first transaction function device includes a cash dispenser, wherein the first transaction function corresponds to dispensing cash with the cash dispenser, wherein in step (f) the verbal description includes at least one spoken word representative of the term "withdrawal".

39. The method according to claim 38 further comprising:
   k) causing the automated banking machine to operate to produce fourth audible output through the portable speaker device, wherein the fourth audible output includes a second verbal instruction requesting that the dispensed amount of cash be taken.

40. The method according to claim 39, wherein in step (k) the second verbal instruction includes a description of a location on the automated banking machine from which the dispensed amount of cash may be taken.

41. Computer readable media bearing computer executable instructions operative to cause at least one computer in an automated banking machine to cause the automated banking machine to carry out a method comprising:
   a) detecting responsive to operation of at least one computer in an automated banking machine, operative connection of a portable speaker device to an external port of the automated banking machine, wherein the automated banking machine includes a keypad including a plurality of keys, wherein the plurality of keys includes a first key and a second key; and
   b) responsive to detecting connection of the portable speaker device, causing the automated banking machine to operate to produce audible outputs through the portable speaker device which include verbal information;
   c) operating a computer program in the at least one computer, wherein the computer program is capable of being in a plurality of states;
   d) responsive to the program being in a first state, causing the automated banking machine to operate to produce a first audible output through the portable speaker device, wherein the first audible output includes first verbal instructions for operating the automated banking machine, wherein the first verbal instructions indicate which of the plurality of keys of the keypad are respectively associated with each of a plurality of different transaction functions the automated banking machine is capable of performing, and wherein responsive to the program being in the first state the automated banking machine is operative to enable selection of each of the plurality of transaction functions through actuation of different keys of the keypad, and wherein actuation of the second key corresponds to selection of a first transaction function;
   e) through operation of the automated banking machine, receiving inputs including a first received input including actuation of the first key of the keypad immediately sequentially followed by a second received input including actuation of the second key of the keypad;
   f) responsive to (e) causing the automated banking machine to operate to produce a second audible output through the portable speaker device, wherein the second audible output includes a verbal description of the first transaction function, wherein during the second audible output the program remains in the first state;
   g) through operation of the automated banking machine, receiving a third received input including actuation of the second key of the keypad, wherein the third received inputs does not immediately sequentially follow actuation of the first key of the keypad; and
   h) responsive to (g) causing the automated banking machine to operate such that the program changes from being in the first state of the program to being in a second state of the program, wherein in the second state of the program the automated banking machine is operative to perform the first transaction function.

42. A method comprising:
   a) detecting responsive to operation of at least one computer in an automated teller machine (ATM), operative connection of a headphone to an external port of the ATM, wherein the ATM includes a cash dispenser, and a keypad, wherein the keypad includes a plurality of keys including a first key;
   b) responsive to detecting the connection of the headphone in (a), causing the ATM to operate to set a volume level of a first audible output through the external port to a predetermined level, wherein the predetermined level is less than a maximum level for the first audible output;
   c) including in the audible output, responsive to a program operative in at least one computer of the ATM having a first state, first verbal instructions for operating the ATM when the program has such first state, wherein the first verbal instructions direct a user to provide a first input through the keypad of the ATM, wherein the first verbal instructions further indicate that the volume level may be changed by actuating the second key of the keypad;
   d) receiving the first input through the keypad of the ATM; and
   e) responsive to the receipt of the first input, operating the at least one computer to cause the program to have a second state.

43. The method according to claim 42, and further comprising:
   f) responsive to (a), muting a second audible output being directed through an external loud speaker device of the ATM.

44. The method according to claim 42, and further comprising:
   f) detecting the disconnection of the headphone from the external port; and
   g) muting the first audible output being directed through the external port.

45. The method according to claim 44, wherein after step (a) further comprising:
   h) muting a second audible output being directed through an external loud speaker device of the ATM; and
   wherein after step (f) further comprising:
   i) instituting the audible output through the external loud speaker device.

46. The method according to claim 42, wherein after step (e) further comprising:
- f) changing a local output of a sound system device of the ATM to a first condition, wherein the first condition corresponds to the headphone being connected to the external port;
- g) monitoring the logical output of the sound system through operation of a software application operative in the ATM; and
- h) detecting through operation of the software application that the logical output is in the first condition, wherein step (c) is performed responsive to the software application detecting that the logical output is in the first condition.

47. The method according to claim 46, wherein step (c) includes generating the first audible output responsive to a sound file stored in operative connection with the ATM, wherein the sound file is associated with the first state of the ATM.

48. The method according to claim 46, wherein step (c) includes generating the first audible output responsive to an alphanumeric text message stored in operative connection with the ATM, wherein the alphanumeric text message is associated with the first state of the program.

49. The method according to claim 42, wherein in step (a) the headphone includes a wireless headphone, wherein the external port is operative to transmit a wireless signal to the wireless headphones, wherein in step (c) the first audible output is included in the wireless signal.

50. The method according to claim 42, further comprising:
- f) receiving a plurality of second inputs including actuation of the second key of the keypad,
  wherein when the volume level of the first audio output is less than the maximum level, increasing the volume level of the first audio output; and
  wherein when the volume level of the first audio output is at the maximum level, setting the volume level of the first audible output to the predetermined level.

51. Computer readable media bearing computer executable instructions operative to cause at least one computer in an ATM to cause the ATM to carry out a method comprising:
- a) detecting responsive to operation of at least one computer in an automated teller machine (ATM), operative connection of a headphone to an external port of the ATM, wherein the ATM includes a cash dispenser, and a keypad, wherein the keypad includes a plurality of keys including a first key;
- b) responsive to detecting the connection of the headphone in (a) causing the ATM to operate to set a volume level of a first audible output through the external port to a predetermined level, wherein the predetermined level is less than a maximum level for the first audible output;
- c) including in the audible output, responsive to a program operative in at least one computer of the ATM having a first state, first verbal instructions for operating the ATM when the program has such first state, wherein the first verbal instructions direct a user to provide a first input through the keypad of the ATM, wherein the first verbal instructions further indicate that the volume level may be changed by actuating the second key of the keypad;
- d) receiving the first input through the keypad of the ATM; and
- e) responsive to the receipt of the first input, operating the at least one computer to cause the program to have a second state.

* * * * *